US007588193B2

(12) United States Patent
Lowmaster

(10) Patent No.: US 7,588,193 B2
(45) Date of Patent: Sep. 15, 2009

(54) BLOOD COMPONENT CONTAINER

(75) Inventor: Christine M. Lowmaster, Palatine, IL (US)

(73) Assignee: Fenwal, Inc., Lake Zurich, IL (US)

( * ) Notice: Subject to any disclaimer, the term of this patent is extended or adjusted under 35 U.S.C. 154(b) by 290 days.

(21) Appl. No.: 11/376,790

(22) Filed: Mar. 16, 2006

(65) Prior Publication Data

US 2006/0196951 A1 Sep. 7, 2006

(51) Int. Cl.
*G06K 19/06* (2006.01)

(52) U.S. Cl. .................. 235/494; 235/462.01; 235/487

(58) Field of Classification Search ............ 235/462.01, 235/487, 494, 385; 604/403, 408, 404
See application file for complete search history.

(56) References Cited

U.S. PATENT DOCUMENTS

| | | | | |
|---|---|---|---|---|
| 5,314,421 | A * | 5/1994 | Leuenberger | 604/403 |
| 6,550,685 | B1 * | 4/2003 | Kindberg | 235/494 |
| 6,729,369 | B2 * | 5/2004 | Neas et al. | 141/231 |
| 2006/0032923 | A1 * | 2/2006 | Krupa | 235/462.01 |

OTHER PUBLICATIONS

Li et al. ("From Codabar to ISBT 128: Implementing Barcode Technology in Blood Bank Automation System" Sep. 1-4, 2005, pp. 542-545).*

"American Red Cross Support for ISBT 128" ("http://www.digi-trax.com/whitepaperfiles/ISBT128.RedCross.Hosp.FAQ.2-06.News.pdf", Feb. 2006).*

Guidelines for the Blood Transfusion Services in the UK 2001, Part 7 "Specification for uniform labelling and standards for EDI"—Chapter 24 "Uniform labelling of blood and blood components". (pp. 1-13).

United States Industry Consensus Standard for the Uniform Labeling of Blood and Blood Components Using ISBT 128, Version 2.0.0, Nov. 2005, (pp. i-xii and 1-78), published by ICCBBA, Inc., York, PA.

ISBT 128 Standard Technical Specification, Version 2.1.0, Aug. 2004, (pp. 134), published by ICCBBA, Inc., York, PA.

United States Industry Consensus Standard for the Uniform Labeling of Blood and Blood Components Using ISBT 128, Version 1.2.0, Nov. 1999, (pp. 94), prepared by: The International Council for Commonality in Blood Banking Automation, Inc., York, PA.

Paul Ashford (Chairman), "An Introduction to ISBT 128", ICCBBA, Inc., 2002, (13 pages), 2nd Edition, From: http://www.iccbba.com.

* cited by examiner

*Primary Examiner*—Seung H Lee
(74) *Attorney, Agent, or Firm*—Cook Alex Ltd.

(57) ABSTRACT

Blood component containers including a label are disclosed. The container label includes a display surface with at least one bar code based on a first bar code format and another bar code based on a second bar code format.

17 Claims, 1 Drawing Sheet

BLOOD COMPONENT CONTAINER

FIELD OF THE INVENTION

Figure 1:
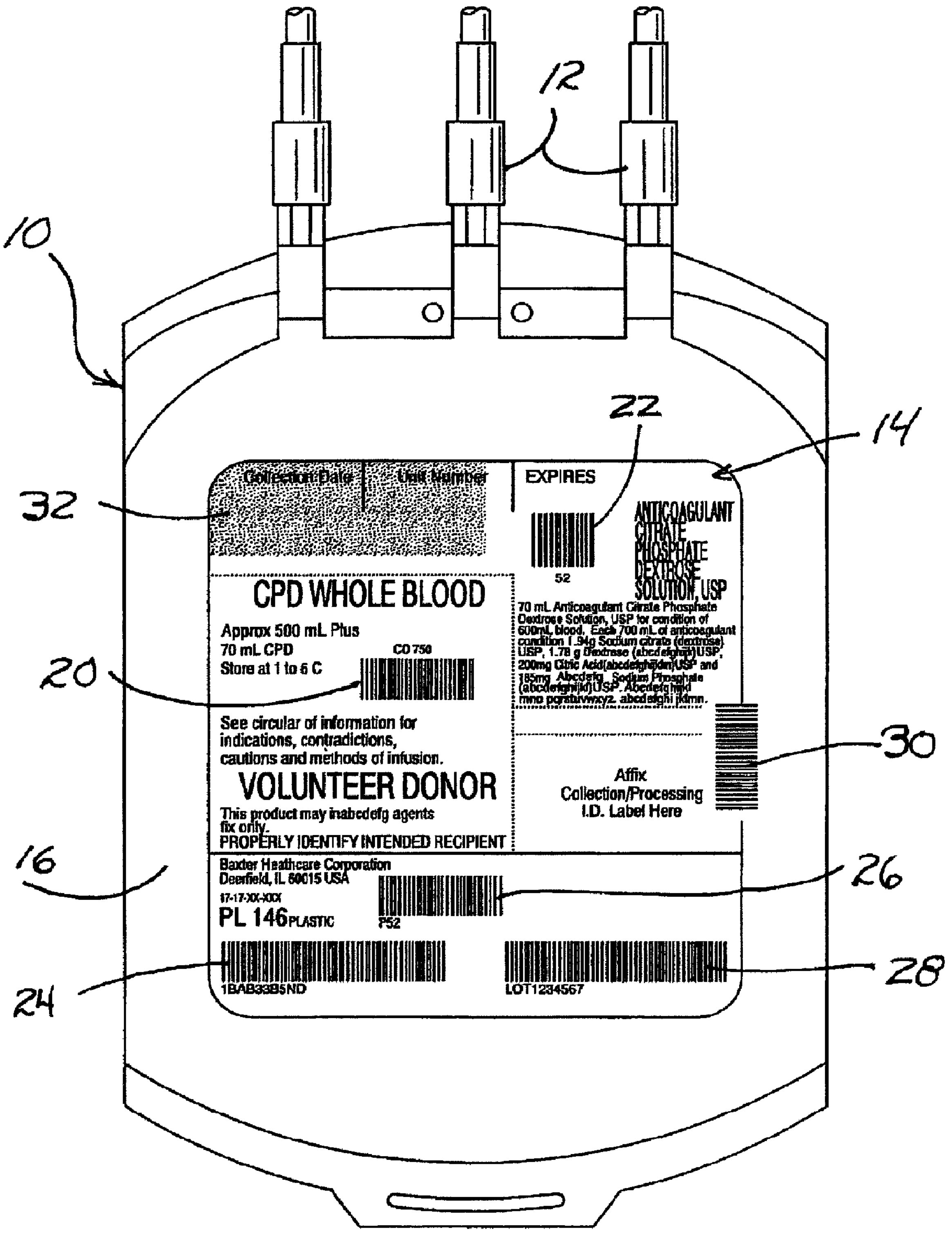

The present invention generally relates to labeling of blood component containers.

BACKGROUND OF THE INVENTION

For approximately the past 20 years, the labeling of containers for blood components, including whole blood, has been in accordance with requirements set forth by the United States Food and Drug Administration in 1985 in "Guidance for Uniform Labeling of Blood Components," incorporated by reference herein. In accordance with the 1985 guidance, labeled blood component containers have contained machine-readable information in a format in accordance with ABC Codabar Bar Code Symbology. The ABC Codabar was a format originally proposed by the American Blood Commission ("ABC") and recognized by the Food and Drug Administration in 1985 as the only currently approved machine-readable symbology for use in blood component labeling in the United States. Labels pursuant to ABC Codabar format have included a bar code that includes a description of the container type and a bar code that includes the product code information assigned by the Food and Drug Administration for the intended contents of the container, for example whole blood, red blood cells or platelets and other components.

The International Society for blood transfusion (ISBT) recognized that the ABC Codabar had reached the end of its useful life and approved a new ISBT Code 128 Bar Code Labeling specification for blood products. The ISBT Bar Code labeling standard is based on the Code 128 symbology, which is different bar code format than the ABC Codabar symbology, and includes improvements in security, to reduce reading errors, to provide additional information and other improvements.

In October 2005, the American Association of Blood Banks (the "AABB") committed to the use of new standards for blood component container labeling, as set forth in "United States Industry Consensus Standard for the Uniform Labeling of Blood and Blood Components using ISBT 128", also incorporated by reference herein. The deadline for implementation of ISBT 128 by AABB accredited facilities is May 1, 2008.

Although the AABB has selected a deadline of May 1, 2008 for implementation by accredited facilities, it is contemplated that not all facilities will adopt the ISBT 128 standard simultaneously. Instead, different blood banks will convert to the ISBT 128 Standard at different times. For this reason, it is anticipated that the co-existence of both types of bar coding systems for blood component containers will persist for a substantial period of time, as blood banks transition from the earlier ABC Codabar system to the new ISBT 128 System.

For manufacturers of blood component containers and users of such containers who are transitioning from the ABC Codabar to the ISBT 128 Standard, efficient inventory management and quality control issues and difficulties may arise from the need to maintain separate inventories of blood component containers, some of which are based on the ABC Codabar Symbology and others of which are based on the ISBT 128 Standard. For a user that switches from ABC Codabar to ISBT 128, there may be wasted inventory of previously purchased blood component containers using the ABC Codabar Symbology. For manufacturers, the manufacturer of the same blood component container with different labels creates serious logistical issues. The manufacturer must duplicate inventory and manage distribution to the appropriate individual purchasers, which will vary because different purchasers will be employing different systems or be at different stages of conversion from the ABC Codabar system to the ISBT 128 system.

As a result, there is a need for blood component containers that do not suffer from the drawbacks described above and allow for a ready and relatively painless transition from the earlier ABC Codabar System to the new ISBT 128 System by both users and manufacturers.

SUMMARY OF THE INVENTION

In accordance with the present invention, a blood component container is provided that is adapted to accommodate the needs of customers and manufacturers using the ABC Codabar System, the ISBT 128 System, or transitioning between them.

In accordance with one aspect of the present invention, a blood component container is provided which carries a label on a container wall or otherwise, such as by a tie tag. For purposes of this description and the appended claims "blood component" includes without limitation whole blood, red blood cells, platelets, leukocytes, stem cells and plasma. The label has a display surface bearing at least one first bar code based on a first bar code format and at least one second bar code based on a second bar code format different than the first bar code format. The first bar code may include product code information, but the second bar code is preferably free of product code information, thus avoiding potential confusion regarding the contents of the container, i.e., the blood component to be stored in the container.

The display surface may also include a defined area or region for data entry by the user. The data entry area is spaced from the first and second bar codes such that facilitates proper positioning of a suitable overlabel that may be applied by the user.

In accordance with a further aspect of the present invention, the container includes a plurality of first bar codes, with one of the first bar codes potentially including product code information and another of the first bar codes including container-related information, and a plurality of the second bar codes, with one of the second bar codes comprising container manufacturer and catalog information and another of the second bar codes comprising manufacturer lot information. All of the second bar codes are preferably free of product (intended container content) code information, which only appears in one of the plurality of first bar codes.

In accordance with another aspect of the present invention, a blood component container is provided comprising a container wall and a label carried by the wall. The label comprises a display surface bearing at least one first bar code in a first bar code format and at least one second bar code in a second bar code format which is different from the first bar code format. The display surface also includes a defined area for user data entry which is spaced from the at least one first and second bar codes and facilitates desired positioning of an overlabel that may be applied over the manufacturer—supplied label described herein.

DETAILED DESCRIPTION OF THE DRAWINGS

FIG. 1 is a plan view of a blood component container in accordance with the present invention.

DETAILED DESCRIPTION

For purposes of this description, the present invention is illustrated in one embodiment in FIG. 1, which is intended to represent a typical blood component container. It should be noted that the present invention may be used on blood component containers that are employed with manual collection of blood components, either primary or satellite containers, or may be used in connection with blood component containers employed in automated systems, such as the Amicus and Alyx centrifuges systems, sold by Baxter Healthcare Corporation, of Deerfield, Ill.

The manufacture of blood component containers is well known to those skilled in the field. Typically blood component containers are made of a suitable plastic material, and formed by sealing together opposed sheets of plastic material or forming the container by blow molding or other plastic forming process. The present invention does not depend on how the container is formed.

FIG. 1 illustrates a blood component container 10 which employs the present invention, but is otherwise of conventional construction. The container 10 shown in FIG. 1 comprises a pair of facing plastic sheets peripherally sealed together to define the interior chamber of the container. For accessing the interior container one or more ports 12 are provided at the end of the container. The ports may directly open into the container or may include a piercable diaphragm or a frangible obstruction located within the port, which can be opened by user external manipulation to break the frangible obstruction and open flow through the port.

In accordance with the present invention, the container 10, which may contain whole blood or any other component of whole blood as desired, includes a label 14 carried by the container, for example by the front wall 16 of the container or by other arrangement such as a tie tag (which bears the label) attached to the container. Typically the label is affixed to the container or tie tag by adhesive, although other means for attachment of the label may also be employed without departing from the present invention. The label may be made of any suitable material, and one possible material is Teslin® material by PPG Industries, Pittsburgh, Pa. Teslin material is breathable, and its use as a blood container label and associated benefits are described more fully in U.S. Pat. No. 5,314,421, incorporated by reference herein. In accordance with the present invention, the label has a display-surface visible to the user which contains pertinent information regarding the container, its intended contents and other important information.

More specifically, the display surface carries or bears at least one first bar code and preferably a plurality of first bar codes, such as first bar code 20 and/or first bar code 22, that are based on a first bar code format, such as the ABC Codabar format discussed above. In addition, the display surface bears at least one and preferably a plurality of second bar codes, such as second bar codes 24, 26, 28 and 30, in a second bar code format, such as the ISBT 128 format and/or other format, which is/are different from the first bar code format. In addition to the first and second bar codes 20, 22, 24, 26, 28, and 30, the display surface preferably includes a defined user data entry area or region 32 for user data entry regarding the specific procedure carried out with the container.

The blood component container illustrated in FIG. 1 and the bar codes thereon are intended to be exemplary only. Turning now to more specific description of the information that may be contained within the various illustrated bar codes, the illustrated first bar code 20, if present, contains product code information based on intended contents of the container, such as whole blood, red blood cells, platelets or plasma and other blood components. First bar code 22 contains container information of use mainly to the user of the containers, such as identification of the container as a primary, satellite or transfer container, the anticoagulant associated with the container, the set of which the container is a part, or other information. If the container is used as a satellite or transfer container it typically does not include the first bar code 20 with product code information.

Second bar code 24 contains information identifying the manufacturer and the catalog number for the container product bearing that label. Second bar code 26, similar to bar code 22, contains container-related information that is useful to the user, for example, identification of the type of container, i.e., primary, satellite or transfer, and/or the type of anticoagulant used. Second bar code 28 contains information identifying the manufacturer's lot number for the specific container bearing that label. Second bar code 30 contains information for the manufacturer's use only, which is typically for internal quality and process control and contains the specification or part number for the particular label in question. The illustrated bar code 30 uses Code 128 symbology but is not an ISBT 128 data structure. In other words, while the ISBT 128 standard specifies how Code 128 bar codes are used in product labeling to transmit information encoded in ISBT 128 data structures, not all Code 128 bar codes are ISBT 128 structures. Further bar code 30 is located at a right angle to the direction of the other bar codes. This orientation has potential benefit as a further safety feature to prevent inadvertent reading or misreading of bar code 30.

In accordance with another aspect of the present invention, the product code information preferably is not duplicated as between the first bar codes 20 and 22 and the second bar codes 24, 26, 28, and 30. The product code information, if present, is preferably contained only in one of the first bar codes and not in any of the second bar codes. This avoids potential confusion and patient safety concerns by the FDA regarding the blood product or contents for which the container is intended.

As illustrated in FIG. 1, it may be seen that the user data entry area or region 32 does not overlap and is spaced from the first bar codes 20 and 22 and the second bar codes 24, 26, 28, and 30. The user data entry area or region may be defined by a shaded area on the label, by demarcation of the boundary by lines or dashes or by other means that makes it clear to the user the intended area or zone for data entry, whether by hand or by over-label. In addition, it is to be noted that the first bar codes 20 and 22 are spaced from and do not overlap or interfere with the second bar codes 24, 26, 28, and 30, so that the bar codes can be readily and separately readable by the appropriate bar code scanning device. The user data entry area also facilitates proper positioning of any overlabel that may be applied over the label shown in FIG. 1. When, for example, a 4 inch by 4 inch overlabel is properly applied by the user over the 4 inch by 4.25 inch label of FIG. 1, the human readable information for the manufacturer's catalog number and lot number will still be visible in the bottom 0.25 inches of the label in FIG. 1.

The advantages of the present invention are significant. For a user who has not converted to the ISBT 128 format, the first bar codes 20 and 22 in the ABC Codabar format are readily readable and contain the information needed by that particular blood bank or blood collection center that is still following the ABC Codabar protocol. On the other hand, for a blood collection center that has converted or is converting to the ISBT 128 format, the second bar codes 24, 26, and 28 , which are in the ISBT 128 format, and the second bar code 30 in the Code 128 format, are readily readable by the associated bar code reader and scanning equipment.

Similarly, if the container is used at different facilities that employ different bar code formats, it is readily readable by either facility. For example, if whole blood is collected at a facility employing the ABC Codabar format, the necessary information is readily available and readable in accordance with the prior approved procedure. If the blood is later processed or handled at a different facility using the ISBT 128 format, some systems will be capable of overlabeling the Codabar-labeled product with an ISBT 128 format label.

As a result, the present invention provides a blood component container with a new and unique hybrid label that accommodates both ABC Codabar and ISBT 128 systems, alleviating the need for dual or multiple inventories or complicated inventory tracking or shipping procedures.

What is claimed is:

1. A blood component container comprising:

a label carried by the container, the label comprising a display surface having a first defined area for at least one first bar code containing product code information and being based on a first bar code format, and a second defined area for at least one second bar code in a second bar code format different than the first bar code format, wherein the second defined area includes at least one second bar code being free of product code information.

2. The container of claim 1 wherein the first defined area includes a plurality of first bar codes on the label display surface, one of the first bar codes including product code information and another of the first bar codes including container-related information, and wherein the second defined area includes a plurality of the second bar codes on the label display surface, one of the second bar codes comprising container manufacturer and catalog number information and another of the second bar codes comprising lot number information, all said second bar codes being free of product code information.

3. The container of claim 2 in which the display surface includes a third defined area for user data entry which is spaced from the plurality of first a nd second bar codes and facilitates positioning of an overlabel.

4. The container of claim 3 in which the plurality of second bar codes are spaced from the plurality of first bar codes to allow reading one of the plurality of first or second bar codes without interference from the other of the plurality of first or second bar codes.

5. The container of claim 1 wherein the first defined area includes at least one first bar code containing product code information.

6. The container of claim 5 in which the display surface includes a third defined area for user data entry which is spaced from the at least one first and second bar codes and facilitates positioning of an overlabel.

7. The container of claim 6 wherein one or more of the defined areas comprises at least one of a solid line, a dashed line, shading, colorations, and written instructions.

8. The container of claim 5 in which the first bar code format is based on ABC Codabar symbology and the second bar code format is based on ISBT 128 symbology.

9. The container of claim 5 further comprising a second first bar code containing container information.

10. The container of claim 9 further comprising a plurality of second bar codes, at least one of which includes container information.

11. The container of claim 5 further comprising a plurality of second bar codes, at least one of which includes manufacturer and catalog number information.

12. The container of claim 5 further comprising a plurality of second bar codes, at least one of which includes lot number information.

13. A blood component container comprising a container wall, and a label carried by the wall, the label comprising a display surface bearing at least one first defined area for a first bar code in a first bar code format, at least one second defined area for a second bar code in a second bar code format different than the first bar code format, and at least one third defined area for user data entry, wherein the at least one second defined area includes the second bar code, and wherein the at least one third defined area is spaced from the at least one first defined area and the at least one second defined area and facilitates positioning of an overlabel.

14. The container of claim 13 which includes a plurality of first bar codes on the first defined area of the label display surface, one of the first bar codes including product code information and another of the first bar codes including container-related information, and a plurality of second bar codes on the second defined area of the label display surface, one of second bar codes comprising container manufacturer and catalog number information and another of the second bar codes comprising lot number information.

15. A blood component container comprising a label carried by the container, the label comprising a display surface free of an overlabel and bearing a first bar code in a first bar code format and a plurality of second bar codes in a second bar code format different than the first bar code format; the display surface including a defined area for user data entry which is spaced from the first and second bar codes and facilitates positioning of an overlabel; the first bar code including product code information, and one of the second bar codes comprising container manufacturer and catalog number information and another of the second bar codes comprising lot number information, all said second bar codes being free of product code information, and wherein the first bar code format is based on ABC Codabar symbology and the second bar code format is based on ISBT 128 symbology.

16. The container of claim 15 in which the plurality of second bar codes are spaced from the first bar code to allow reading one of the first or plurality of second bar codes without interference from the other of the first or plurality of second bar codes.

17. The container of claim 15 further comprising a second first bar code which contains container-related information.

* * * * *